(12) United States Patent
Kato et al.

(10) Patent No.: US 11,262,761 B2
(45) Date of Patent: Mar. 1, 2022

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Daichi Kato, Wako (JP); Kazuyuki Takahashi, Wako (JP); Akihiko Otsu, Wako (JP); Akira Mizutani, Wako (JP); Atsushi Ishioka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 194 days.

(21) Appl. No.: 16/473,656

(22) PCT Filed: Feb. 3, 2017

(86) PCT No.: PCT/JP2017/003910
§ 371 (c)(1),
(2) Date: Jun. 26, 2019

(87) PCT Pub. No.: WO2018/142560
PCT Pub. Date: Aug. 9, 2018

(65) Prior Publication Data
US 2019/0354107 A1 Nov. 21, 2019

(51) Int. Cl.
*G05D 1/02* (2020.01)
*B60W 10/20* (2006.01)
(Continued)

(52) U.S. Cl.
CPC ........... *G05D 1/0212* (2013.01); *B60W 10/20* (2013.01); *B60W 30/10* (2013.01);
(Continued)

(58) Field of Classification Search
CPC ........ G05D 1/0212; G05D 2201/0213; B60W 10/20; B60W 30/10; B60W 30/146;
(Continued)

(56) References Cited

U.S. PATENT DOCUMENTS

2008/0129545 A1* 6/2008 Johnson ............... G07B 15/063
340/933
2018/0174371 A1* 6/2018 Um ..................... G06K 9/00798
(Continued)

FOREIGN PATENT DOCUMENTS

CN 101403622 4/2009
CN 102649408 8/2012
(Continued)

OTHER PUBLICATIONS

Machine translation of JP2012133614A (Year: 2012).*
(Continued)

*Primary Examiner* — Frederick M Brushaber
(74) *Attorney, Agent, or Firm* — Amin, Turocy & Watson, LLP

(57) ABSTRACT

A vehicle control system includes a virtual line setter configured to set virtual lines in front of a gate on the basis of the position of the gate, and a gate passing controller configured to perform vehicle control when a vehicle passes through the gate on the basis of the virtual lines set by the virtual line setter.

15 Claims, 12 Drawing Sheets

(51) Int. Cl.
*B60W 30/10* (2006.01)
*B60W 30/14* (2006.01)
*G07B 15/00* (2011.01)
*G08G 1/0967* (2006.01)
*G07B 15/06* (2011.01)
*G08G 1/16* (2006.01)

(52) U.S. Cl.
CPC .......... *B60W 30/146* (2013.01); *G07B 15/00* (2013.01); *G08G 1/096725* (2013.01); *G08G 1/096758* (2013.01); *B60W 2552/00* (2020.02); *B60W 2554/00* (2020.02); *G05D 2201/0213* (2013.01)

(58) Field of Classification Search
CPC .......... B60W 2552/00; B60W 2554/00; G07B 15/00; G07B 15/06; G08G 1/096725; G08G 1/096758; G08G 1/167
See application file for complete search history.

(56) References Cited

U.S. PATENT DOCUMENTS

2020/0027344 A1* 1/2020 Gerges ............... G06K 9/00818
2020/0090418 A1* 3/2020 Grona ................ G06K 9/00771
2020/0108868 A1* 4/2020 Kim .................. G06K 9/00798
2021/0124885 A1* 4/2021 Ibrahim ................ G07B 15/04

FOREIGN PATENT DOCUMENTS

| JP | 2012-133614 | 7/2012 |
| JP | 2013-232079 | 11/2013 |
| JP | 2015-111386 | 6/2015 |
| JP | 2016-222170 | 12/2016 |
| JP | 2017-004210 | 1/2017 |

OTHER PUBLICATIONS

Machine translation of JP2017004210A (Year: 2017).*
Machine translation of JP2015111386A (Year: 2015).*
Machine translation of JP2016222170A (Year: 2016).*
International Search Report and Written Opinion for International Application No. PCT/JP2017/003910 dated May 9, 2017, 10 pgs.
Chinese Office Action for Chinese Patent Application No. 201780078018.5 dated Oct. 9, 2021.

* cited by examiner

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a storage medium.

BACKGROUND ART

Conventionally, technologies for controlling a vehicle such that the vehicle does not deviate from lanes are known. With respect to this, a device which sets virtual lines when lines drawn on the surfaces of roads on the left and right of a vehicle have faded and thus cannot be detected or when the lines are not present is known (refer to Patent Document 1, for example).

CITATION LIST

Patent Literature

Patent Document 1

Japanese Unexamined Patent Application, First Publication No. 2013-232079

SUMMARY OF INVENTION

Technical Problem

However, the aforementioned device does not set virtual lines in the vicinity of toll gates. This is because an actual traveling lane may not be consistent with virtual lines because the width of a traveling lane changes near a toll gate in many cases. Accordingly, there are cases in which vehicles cannot be smoothly controlled in places in which there is a high likelihood that a traveling lane may not be consistent with virtual lines, such as toll gates.

An object of the present invention devised in view of the aforementioned circumstances is to provide a vehicle control system, a vehicle control method, and a vehicle control program capable of controlling vehicles more smoothly.

Solution to Problem

According to an aspect, a vehicle control system includes a virtual line setter configured to set virtual lines in front of a gate on the basis of the position of the gate, and a gate passing controller configured to perform vehicle control when a vehicle passes through the gate on the basis of the virtual lines set by the virtual line setter.

According to another aspect, the virtual line setter is configured to set the virtual lines such that the virtual lines extend from pillar parts of the gate to the front side in the vehicle control system.

According to another aspect, the virtual line setter is configured to set the virtual lines on the basis of road signs in front of the gate in the vehicle control system.

According to another aspect, the virtual line setter is configured to set second virtual lines associated with a second gate neighboring a first gate on the basis of first virtual lines associated with the first gate and set on the basis of the road signs in the vehicle control system.

According to another aspect, the virtual line setter is configured to set the virtual lines on the basis of a vehicle queue formed in front of the gate in the vehicle control system.

According to another aspect, the virtual line setter is configured to set fourth virtual lines associated with a fourth gate neighboring a third gate on the basis of third virtual lines associated with the third gate and set on the basis of the vehicle queue in the vehicle control system.

According to another aspect, the vehicle control system further includes a gate information acquirer configured to acquire information representing operating states of gates, wherein the virtual line setter is configured to set virtual lines associated with a gate which is not closed and recognized on the basis of information acquired by the gate information acquirer.

According to another aspect, the virtual line setter is configured to set the virtual lines on the basis of behaviors of vehicles present around a host vehicle in the vehicle control system.

According to another aspect, the virtual line setter acquires positional information of vehicles which have traveled in front of the gates and is configured to set the virtual lines on the basis of the acquired positional information in the vehicle control system.

According to another aspect, a vehicle control method includes, through an onboard computer, setting virtual lines in front of a gate on the basis of the position of the gate, and performing vehicle control when a vehicle passes through the gate on the basis of the set virtual lines.

According to another aspect, a non-transitory computer-readable storage medium that stores a vehicle control program causing an onboard computer to set virtual lines in front of a gate on the basis of the position of the gate, and to perform vehicle control when a vehicle passes through the gate on the basis of the set virtual lines.

Advantageous Effects of Invention

According to the above aspects, the gate passing controller can control a vehicle more smoothly in front of a gate by performing vehicle control when the vehicle passes through the gate on the basis of virtual lines set by a virtual line setter.

According to the above aspects, the virtual line setter can set appropriate virtual lines for a host vehicle by setting virtual lines on the basis of road markings between the position of a vehicle and the position of a gate.

According to the above aspects, the virtual line setter can set virtual lines suitable for actual situations by setting virtual lines on the basis of a vehicle queue formed in front of a gate.

According to the above aspects, it is possible to omit unnecessary processes by setting virtual lines associated with a gate which is not closed.

According to the above aspects, it is possible to set virtual lines more suitable for actual situations by setting virtual lines on the basis of behaviors of vehicles present around a host vehicle.

According to the above aspects, the virtual line setter can set more appropriate virtual lines by using positional information of vehicles which have traveled in an area between a host vehicle and the position of a gate.

DESCRIPTION OF EMBODIMENTS

Hereinafter, embodiments of a vehicle control system, a vehicle control method, and a vehicle control program of the present invention will be described with reference to the drawings.

First Embodiment

[Overall Configuration]

Figure 1:
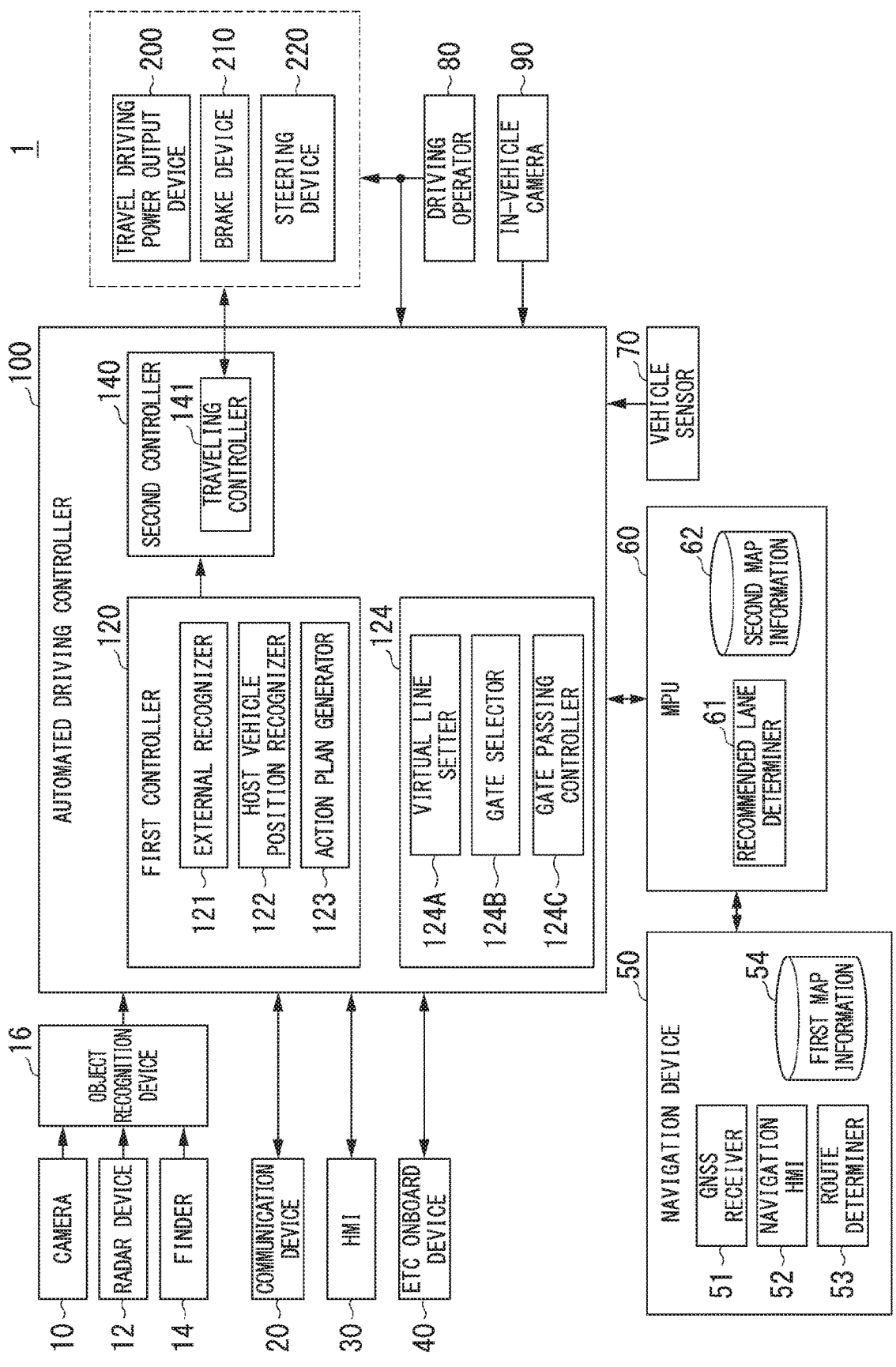
FIG. 1 is a diagram showing a configuration of a vehicle system 1 including an automated driving controller 100.

FIG. 1 is a diagram showing a configuration of a vehicle system 1 including an automated driving controller 100. For example, a vehicle equipped with the vehicle system 1 is a two-wheeled, three-wheeled, four-wheeled vehicle or the like and a driving source thereof includes an internal combustion engine such as a diesel engine or a gasoline engine, a motor or a combination thereof. The motor operates using power generated by a generator connected to the internal combustion engine or power discharged from a secondary battery or a fuel battery.

For example, the vehicle system 1 may include a camera 10, a radar device 12, a finder 14, an object recognition device 16, a communication device 20, a human machine interface (HMI) 30, an electronic toll collection system (ETC) onboard device 40, a navigation device 50, a microprocessing unit (MPU) 60, a vehicle sensor 70, a driving operator 80, an in-vehicle camera 90, an automated driving controller 100, a travel driving power output device 200, a brake device 210, and a steering device 220. These devices and apparatuses are connected through a multiplex communication line such as a controller area network (CAN), and a serial communication line, a wireless communication network, and the like. Meanwhile, the configuration shown in FIG. 1 is merely an example and a part of the configuration may be omitted or other configurations may be further added. The camera 10, the object recognition device 16 and the communication device 20 are an example of an "information acquirer."

For example, the camera 10 may be a digital camera using a solid state imaging device such as a charge coupled device (CCD) or a complementary metal oxide semiconductor (CMOS). One or a plurality of cameras 10 are attached to any portions of a vehicle in which the vehicle system 1 is mounted (hereinafter referred to as a host vehicle M). When a front view image is captured, the camera 10 is attached to the upper part of the front windshield, the rear side of a rear view mirror, or the like. For example, the camera 10 may periodically and repeatedly capture images of the surroundings of the host vehicle M. The camera 10 may be a stereo camera.

The radar device 12 radiates electric waves such as millimeter waves to the surroundings of the host vehicle M and detects electric waves (reflected waves) reflected by an object to detect at least the position (distance and direction) of the object. One or a plurality of radar devices 12 are attached to any portions of the host vehicle M. The radar device 12 may detect the position and speed of an object according to a frequency modulated continuous wave (FM-CW) method.

The finder 14 is a light detection and ranging or laser imaging detection and ranging (LIDAR) device which measures scattering light with respect to radiated light and detects a distance to a target. One or a plurality of finders 14 are attached to any portions of the host vehicle M.

The object recognition device 16 performs a sensor fusion process on detection results of some or all of the camera 10, the radar device 12 and the finder 14 to recognize the position, type, speed and the like of an object. The object recognition device 16 outputs a recognition result to the automated driving controller 100.

The communication device 20 communicates with other vehicles around the host vehicle M using a cellular network, a Wi-Fi network, Bluetooth (registered trademark), dedicated short range communication (DSRC) and the like, for example, or communicates with various server devices through a wireless base station.

The HMI 30 presents various types of information to an occupant of the host vehicle M and receives an input operation from the occupant. The HMI 30 includes various display devices, speakers, buzzers, touch panels, switches, keys, and so on.

The ETC onboard device 40 communicates with an ETC roadside device to exchange information on an entrance toll gate, an exit toll gate and the like therewith. The ETC onboard device 40 includes a mounting part in which an ETC card (EC) is mounted, a detector which detects whether an ETC card is mounted in the mounting part, a wireless communicator part which communicates with an ETC roadside device provided to a gate of a toll road, and a notification unit. The ETC card is a medium in which authentication information (AI) for the host vehicle M to pass through a toll road is stored. The wireless communicator and the communication device 20 are made to be common.

The mounting part includes an insertion/extraction mechanism capable of mounting and removing an ETC card. The detector detects whether an ETC card has been mounted in or removed from the mounting part. The detector outputs a detection result to the automated driving controller 100. Further, the detector may include a notification unit which detect validity or invalidity of an ETC card based on the expiration date of the ETC card. In this case, the detector may determine that the ETC card has been mounted when the ETC card is valid and determine that the ETC card has been removed when the ETC card is invalid.

The wireless communicator transmits authentication information stored in the ETC card to an ETC roadside device in response to a request received from the ETC roadside device. The wireless communication part acquires information such as whether a gate at which the ETC roadside device is installed can be passed, an entrance toll gate and an exit toll gate on the basis of an authentication result received from the ETC roadside device. The ETC roadside device determines an amount charged for an occupant of the host vehicle M on the basis of information received from the ETC onboard device and performs a charging process.

The notification unit is a speaker which outputs voice, an indicator, and the like. The notification unit notifies an occupant of an ETC card mounting state and an authentication result acquired through the wireless communicator.

The navigation device 50 may include a global navigation satellite system (GNSS) receiver 51, a navigation HMI 52 and a route determiner 53, for example, and stores first map information 54 in a storage device such as a hard disk drive (HDD) or a flash memory. The GNSS receiver identifies the position of the host vehicle M on the basis of signals received from a GNSS satellite. The position of the host vehicle M may be identified or complemented by an inertial navigation system (INS) using an output of the vehicle sensor 70. The navigation HMI 52 includes a display device, a speaker, a touch panel, keys, and so on. A part or all of the navigation HMI 52 and the aforementioned HMI 30 may be made to be common. The route determiner 53 determines a route to a destination input by an occupant using the navigation HMI 52 from the position of the host vehicle M identified by the GNSS receiver 51 (or any input position) with reference to the first map information 54, for example. The first map information 54 is information representing road shapes according to links indicating roads and nodes connected by links, for example. The first map information 54 may include curvature and point of interest (POI) information of roads, and the like. A route determined by the route determiner 53 is output to the MPU 60. In addition, the navigation device 50 may perform route guide using the navigation HMI 52 on the basis of the route determined by the route determiner 53. Meanwhile, the navigation device 50 may be implemented by functions of a terminal device such as a smartphone or a tablet terminal possessed by a user, for example. Further, the navigation device 50 may transmit a current position and a destination to a navigation server through the communication device 20 and acquire a route received from the navigation server.

The MPU 60 serves as a recommended lane determiner 53, for example, and stores second map information 62 in a storage device such as an HDD or a flash memory. The recommended lane determiner 53 divides a route provided from the navigation device 50 into a plurality of blocks (divides the route into intervals of 100 m in a vehicle traveling direction, for example) and determines a target lane for each block with reference to the second map information 62. The recommended lane determiner 53 performs determination in such a manner that on which lane from the left the vehicle will travel is determined. When a route includes a branch point, a merging point, and the like, the recommended lane determiner 53 determines recommended lanes such that the host vehicle M can travel on a reasonable route for traveling to a branch destination.

The second map information 62 is map information with higher-accuracy than the first map information 54. For example, the second map information 62 may include information on the centers of lanes or information on the boundaries of lanes. In addition, the second map information 62 may include road information, traffic regulations information, address information (addresses and zip codes), facility information, telephone number information, and so on. Road information includes information representing types of roads such as a highway, a toll road, a national highway and a prefectural road and information such as the number of lanes of roads, the width of each lane, slopes of roads, locations of roads (three-dimensional coordinates including longitudes, latitudes and heights), curvatures of curves of lanes, the positions of merging points and branch points of lanes, and signs provided to roads. The second map information 62 may be updated at any time by accessing other devices using the communication device 20.

In addition, the second map information 62 stores information representing gate structures such as entrance toll gates and exit toll gates. For example, the information representing gate structures may be information representing the number of gates installed in toll gates and the positions of the gates.

The vehicle sensor 70 includes a vehicle speed sensor which detects the speed of the host vehicle M, an acceleration sensor which detects an acceleration, a yaw rate sensor which detects an angular velocity around a vertical axis, a heading sensor which determines the direction of the host vehicle M, and so on.

The driving operator 80 includes an accelerator pedal, a brake pedal, a shift lever, a steering wheel, and other operators, for example. A sensor that detects an operation amount or presence or absence of an operation is attached to the driving operator 80 and a detection result thereof is output to the automated driving controller 100 or one or all of the travel driving power output device 200, the brake device 210 and the steering device 220.

The in-vehicle camera 90 captures an image of the upper half of the body having the face at the center of an occupant sitting on the driver's seat. The captured image of the in-vehicle camera 90 is output to the automated driving controller 100.

The automated driving controller 100 may include a first controller 120, a second controller 140 and a passing controller 124, for example. Each of the first controller 120, the passing controller 124 and the second controller 140 is implemented by a processor such as a central processing unit (CPU) executing a program (software). Further, some or all of these components may be implemented by hardware such as a large scale integration (LSI) circuit, an application specific integrated circuit (ASIC) and a field-programmable gate array (FPGA) or implemented by software and hardware in cooperation.

The first controller 120 may include an external recognizer 121, a host vehicle position recognizer 122, and an action plan generator 123, for example.

The external recognizer 121 recognizes states such as the positions, speeds and accelerations of surrounding vehicles on the basis of information input from the camera 10, the radar device 12 and the finder 14 through the object recognition device 16. The position of a surrounding vehicle may be represented by a representative point such as the center of gravity or a corner of the surrounding vehicle or by a region represented by the outline of the surrounding vehicle. "States" of a surrounding may include the acceleration and jerk of the surrounding vehicle or an "action state" (e.g., whether lane change is being performed or is intended to be performed). In addition, the external recognizer 121 may recognize the positions of guardrails, electric poles, parked vehicles, pedestrians and other objects in addition to neighboring vehicles.

The host vehicle position recognizer 122 may recognize a lane (traveling lane) in which the host vehicle M is traveling and a relative position and attitude of the host vehicle M with respect to the traveling lane, for example. For example, the host vehicle position recognizer 122 may recognize a traveling lane by comparing a lane marking pattern (e.g., arrangement of solid lines and dashed lines) obtained from the second map information 62 with a lane marking pattern around the host vehicle M recognized from an image captured by the camera 10. In such recognition, the position of the host vehicle M acquired from the navigation device 50 and a processing result of the INS may be additionally taken into account.

Figure 2:
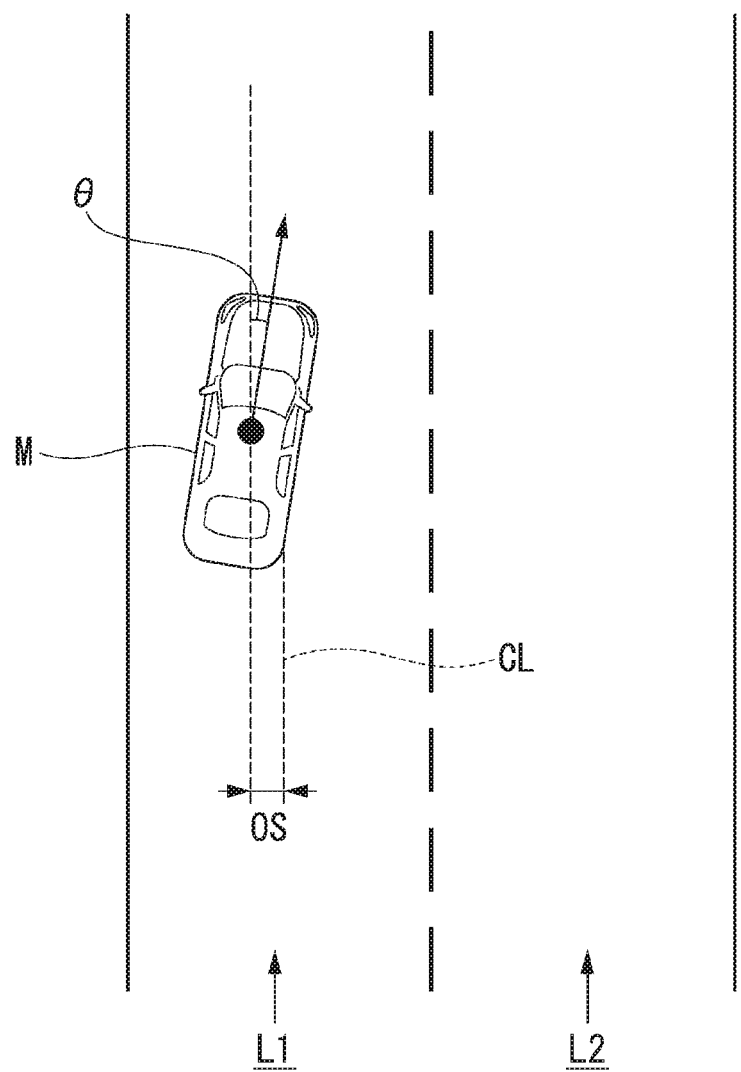
FIG. 2 is a diagram showing a state in which a relative position and an attitude of a host vehicle M with respect to a traveling lane L1 are recognized by a host vehicle position recognizer 122.

In addition, the host vehicle position recognizer 122 may recognize a position and an attitude of the host vehicle M with respect to a traveling lane, for example. FIG. 2 is a diagram showing a state in which a relative position and an attitude of the host vehicle M with respect to a traveling lane L1 are recognized by the host vehicle position recognizer 122. For example, the host vehicle position recognizer 122 may recognize a distance OS between a reference point (e.g., the center of gravity) of the host vehicle M and a traveling lane center CL and an angle θ between a traveling direction of the host vehicle M and a line connecting the traveling lane center CL as a relative position and attitude of the host vehicle M with respect to a traveling lane L1. Instead of this, the host vehicle position recognizer 122 may recognize the position of the reference point of the host vehicle M or the like with respect to any side edge of the host lane L1 as a relative position of the host vehicle M with respect to the traveling lane. The relative position of the host vehicle M recognized by the host vehicle position recognizer 122 is provided to the recommended lane determiner 53 and the action plan generator 123.

The action plan generator 123 determines events to be sequentially executed in automated driving to cause the host vehicle M to travel in a recommended lane determined by the recommended lane determiner 53 and to be able to cope with surrounding situations of the host vehicle M. For example, the events may include a cruise-control event of traveling in the same traveling lane at a uniform speed, a following travel event of following a preceding vehicle, a lane change event, a merging event, a branching event, an emergency stop event, a handover event for ending automated driving and switching to manual driving, a toll gate event (which will be described later) executed when a vehicle passes through a toll gate, and the like. Further, there is also a case in which an action for avoidance is planned on the basis of surrounding situations (presence of surrounding vehicles and pedestrians, narrowing of a lane due to road construction, and the like) of the host vehicle M during execution of such events.

The action plan generator 123 generates a target trajectory along which the host vehicle M will travel in the future. For example, a target trajectory may include a speed factor. For example, a target trajectory may be generated as a set of target points (trajectory points) at which the host vehicle M will arrive at a plurality of reference times in the future which are set for each predetermined sampling time (e.g., approximately zero comma several seconds). Accordingly, a case in which a spacing between trajectory points is wide indicates traveling in a section between the trajectory points at a high speed.

Figure 3:
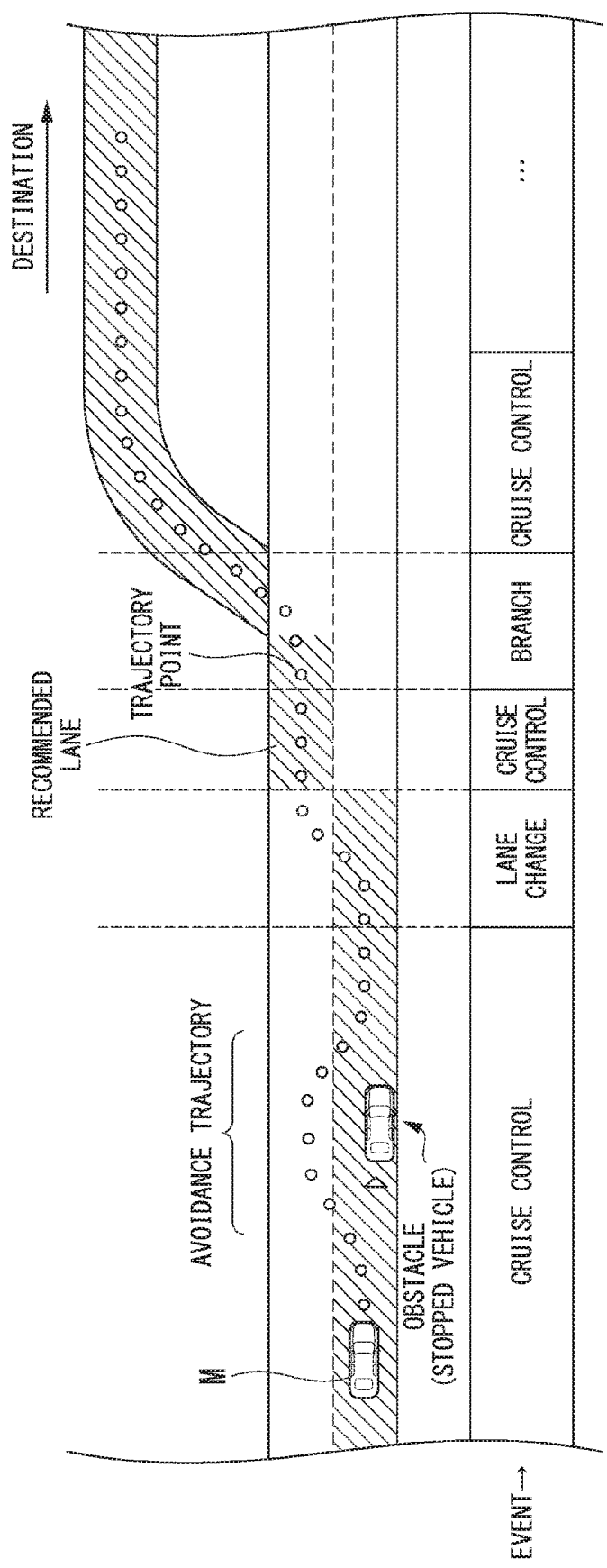
FIG. 3 is a diagram showing a state in which a target trajectory is generated on the basis of a recommended lane.

FIG. 3 is a diagram showing a state in which a target trajectory is generated on the basis of a recommended lane. As shown, a recommended lane is set such that traveling along a route to a destination is convenient. The action plan generator 123 starts a lane change event, a branching event, a merging event or the like when the host vehicle M approaches a predetermined distance (which may be determined according to event type) before a switching point of the recommended lane. When it is necessary to avoid an obstacle during execution of each event, an avoidance trajectory is generated as shown.

For example, the action plan generator 123 may generate a plurality of target trajectory candidates and select the most suitable target trajectory at that time from the viewpoint of stability and efficiency.

In addition, the passing controller 124 includes a virtual line setter 124A, a gate selector 124B, and a gate passing controller 124C. Processes of these functional parts will be described in detail later. A "vehicle control system" may include the virtual line setter 124A, the gate selector 124B and the gate passing controller 124C, for example.

The second controller 140 includes a traveling controller 141. The traveling controller 141 controls the travel driving power output device 200, the brake device 210 and the steering device 220 such that the host vehicle M passes along a target trajectory generated by action plan generator 123 on scheduled time.

The travel driving power output device 200 outputs a travel driving power (torque) for traveling of a vehicle to driving wheels. For example, the travel driving power output device 200 may include a combination of an internal combustion engine, a motor, a transmission and the like, and an electronic controller (ECU) which controls these components. The ECU controls the aforementioned components according to information input from the traveling controller 141 or information input from the driving operator 80.

The brake device 210 includes a brake caliper, a cylinder which transfers a hydraulic pressure to the brake caliper, an electric motor which generates a hydraulic pressure in the cylinder, and a brake ECU, for example. The brake ECU controls the electric motor according to information input from the traveling controller 141 or information input from the driving operator 80 such that a brake torque according to the control operation is output to each vehicle wheel. The brake device 210 may include a mechanism for transferring a hydraulic pressure generated by an operation of the brake pedal included in the driving operator 80 to the cylinder through a master cylinder as a backup. Meanwhile, the brake device 210 is not limited to the above-described configuration and may be an electronically controlled hydraulic brake device which controls an actuator according to information input from the traveling controller 141 and transfers a hydraulic pressure of a master cylinder to a cylinder.

The steering device 220 includes a steering ECU and an electric motor, for example. For example, the electric motor may change the direction of the steering wheel by applying a force to a rack-and-pinion mechanism. The steering ECU drives the electric motor according to information input from the traveling controller 141 or information input from the driving operator 80 to change the direction of the steering wheel.

[Details of Virtual Line Setter, Gate Selector and Gate Passing Controller]

The virtual line setter 124A sets virtual lines in front of a gate on the basis of the position of the gate. The gate selector 124B selects a gate through which the host vehicle M will pass. The gate passing controller 124C executes a toll gate event and controls the travel driving power output device 200, the brake device 210 and the steering device 220 on the basis of virtual lines set by the virtual line setter 124A to control a vehicle such that the vehicle passes through a gate selected by the gate selector 124B.

Figure 4:
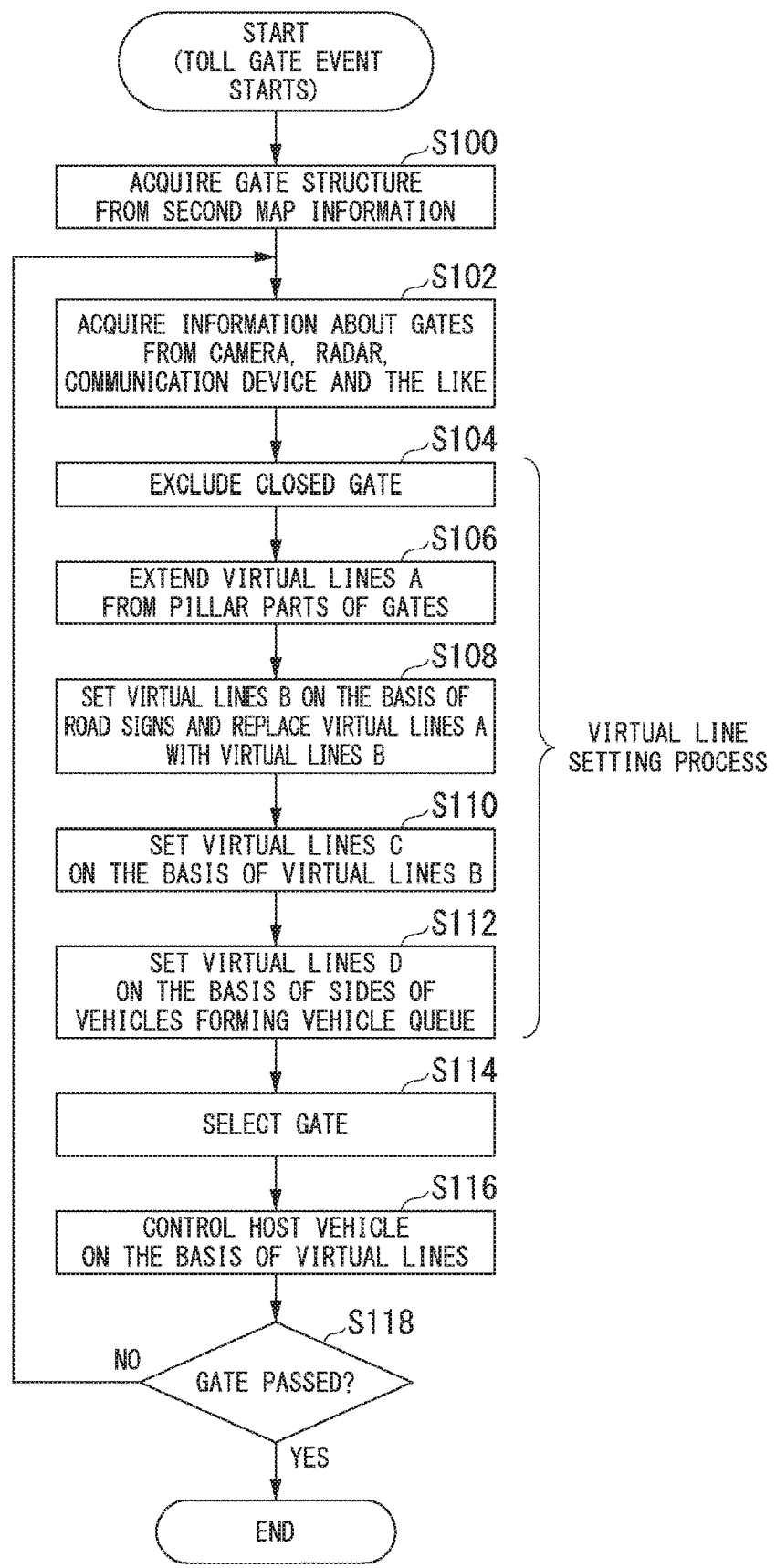
FIG. 4 is a flowchart showing a flow of a procedure performed by a passing controller 124.

FIG. 4 is a flowchart showing a flow of a procedure performed by the passing controller 124. The procedure of this flowchart is performed when the toll gate event has started. For example, the action plan generator 123 may start the toll gate event when the host vehicle M is expected to travel in an area having no lane markings from a predetermined distance before a toll gate. Further, in a case in which start positions indicating positions at which the toll gate event is started are correlated to the second map information 62, the action plan generator 123 starts the toll gate event when the host vehicle M has arrived at a position associated with a start position. Then, the passing controller 124 starts the procedure.

First, the virtual line setter 124A acquires a gate structure from the second map information 62 (step S100). Meanwhile, the gate structure may be acquired on the basis of an image captured by the camera 10. In this case, the object recognition device 16 may recognize the gate structure by analyzing the image, for example. Further, the communication device 20 may acquire the gate structure from a server device connected to a network, or the like using wireless communication.

Then, the virtual line setter 124A acquires information about gates from the camera 10, the radar device 12, the finder 14, the communication device 20 and the like (step S102). For example, the information about gates may include information representing whether a gate is available or closed, information representing gate types, information about vehicles present before gates, information on road markings before gates, and the like. A gate type is information representing whether a gate is an ETC dedicated gate that can be passed using the ETC onboard device 40, a general gate that can be passed when a gate attendant performs a fare adjustment process, or an ETC/general gate for which both of these processes can be performed. For example, the object recognition device 16 may analyze the image captured by the camera 10 to recognize whether a gate is available or closed and recognize the type of gate. In addition, the communication device 20 may acquire information about gates from a server device that manages toll gates which is connected to a network, or the like using wireless communication.

Further, information about vehicles present before a gate or information on road markings and the like before the gate is information acquired by the object recognition device 16 on the basis of images captured by the camera 10 and detection results of the radar device 12, and the like. In addition, when a camera which captures images of states in front of a gate of a toll gate is installed at the gate, the communication device 20 may acquire an image captured by the camera. In this case, the object recognition device 16 may analyze the acquired image to obtain information about vehicles present before the gate, and the like, for example.

Figure 5:
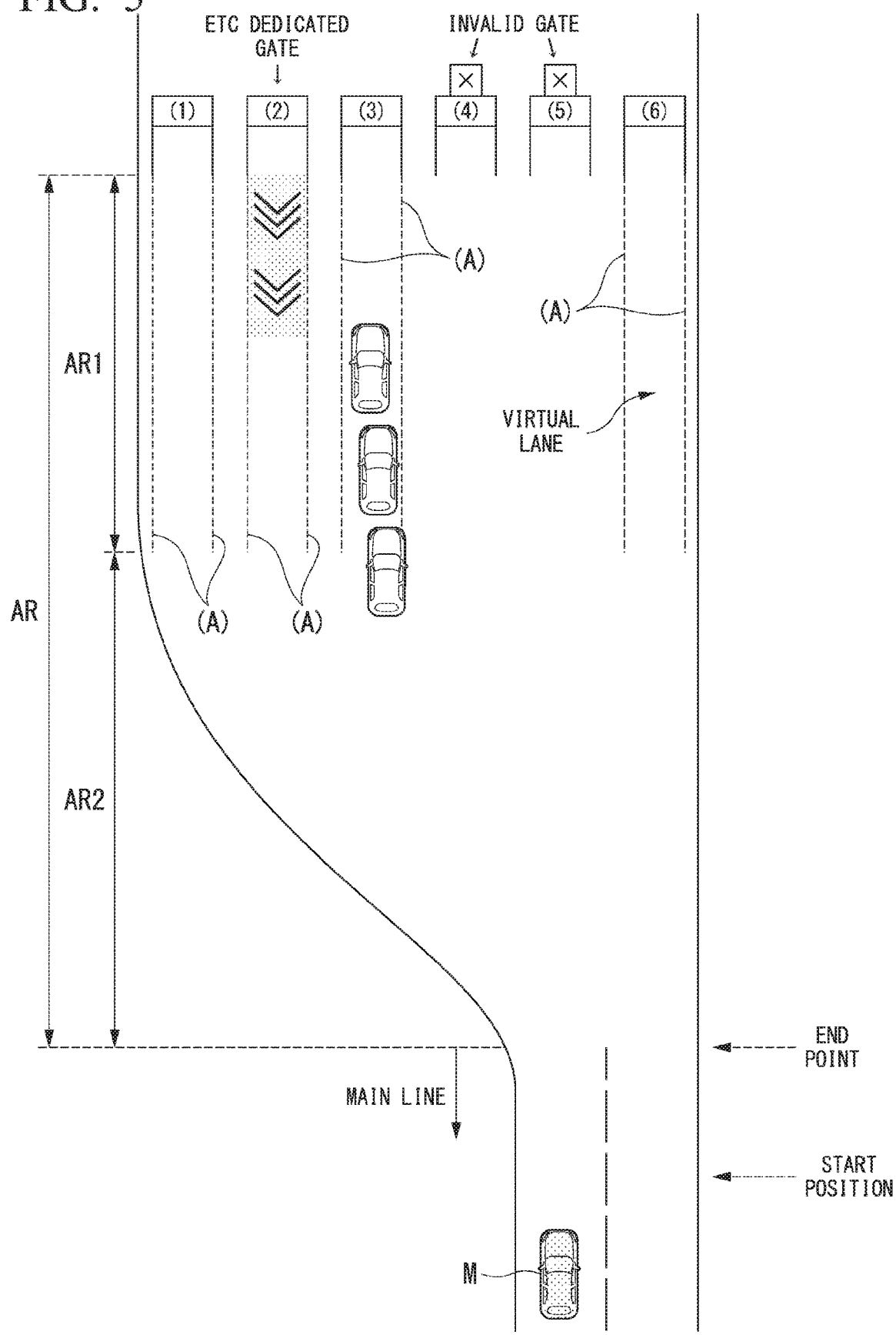
FIG. 5 is a diagram showing an example of a state in the vicinity of gates.

Then, the virtual line setter 124A performs a virtual line setting process (steps S104 to S112). This process will be described in detail with reference to FIGS. 4 to 7. FIG. 5 is a diagram showing an example of a state in the vicinity of the gates. The illustrated example is an example of a situation in which vehicles travel from the front to the back of a place in which gates 1 to 6 are installed, for example. An area from the gates to an end point of a main line (e.g., a point at which lanes of the main line vanish) in front of the gates is a lane marking-free area AR in which lane markings are not drawn on the road surface. Further, gates other than the gate 2 are general gates and the gate 2 is an ECT dedicated gate. With respect to the ETC dedicated gate, for example, a marking extending from both edges of the ETC gate may be drawn on the road surface in front of the ETC dedicated gate. In addition, the gates 4 and 5 are closed gates and other gates are available gates. The virtual line setter 124A acquires the aforementioned information about the gates and recognizes formation of a vehicle queue in front of the gate 3.

The virtual line setter 124A recognizes closed gates on the basis of the information acquired in step S102 and excludes the closed gates from processing targets (step S104). Subsequently, the virtual line setter 124A sets virtual lines A such that the virtual lines extend from pillar parts which are reference positions of gates to the front sides (step S106). In the example of FIG. 5, the virtual line setter 124A sets virtual lines for the gates 1, 2, 3 and 6 which are available gates. Then, a virtual lane is formed by two virtual lines extending from the pillar parts of both edges of a gate. Meanwhile, although virtual lines extending from the pillar parts of both edges of a gate are set in the illustrated example, instead of this, one virtual line may be provided and a virtual line may be extended on the basis of a part other than the pillar parts of a gate.

Then, the virtual line setter 124A sets virtual lines B on the basis of markings drawn on the road surface in front of a gate and replaces the virtual lines A set in step S106 with the virtual lines B (step S108). The virtual line setter 124A sets virtual lines in the longitudinal direction of markings on the road surface in front of the gate 2 on the basis of the markings (refer to FIG. 6).

Meanwhile, the virtual lines A and B are set in a predetermined length from gates to front sides in areas in which vehicles are not present or in a gate front area AR1, for example. The gate front area AR1 is an area in front of a gate which has the same road width as the road width in which the gates 1 to 6 are installed, for example. In addition, the virtual lines B may be set to be longer than the virtual lines A. Meanwhile, an area between the gate front area AR1 and the main line is referred to as a "virtual line-free area AR2."

Figure 6:
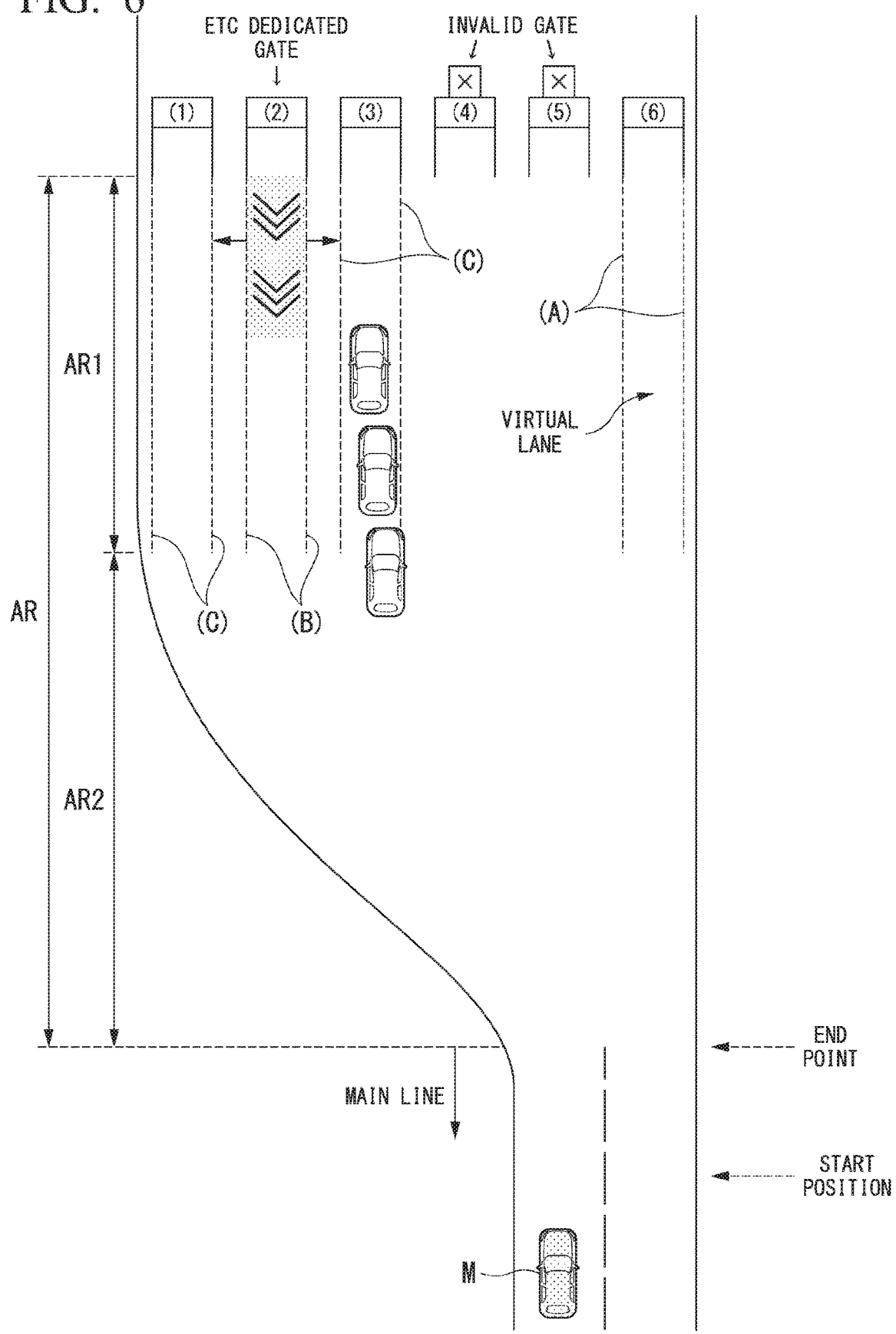
FIG. 6 is a diagram showing an example of a state in which virtual lines C are set.

Then, the virtual line setter 124A sets virtual lines C adjacent to the virtual lines B on the basis of the virtual lines B set in step S108 (step S110). FIG. 6 is a diagram showing an example of a state in which the virtual lines C are set. In the situation of this figure, the virtual line setter 124A replaces the virtual lines A set for the gate 2 with the virtual lines B set for the gate 2. In addition, the virtual line setter 124A sets the virtual lines C for the gate 1 or 3 at a position separated from the virtual lines B by a predetermined width or more and replaces the virtual lines A with the virtual lines C. As a result, even when the position of the virtual lines A has deviated from a correct position, the virtual lines C are set at an appropriate position.

In addition, when a vehicle traveling in a lane marking-free area AR cannot recognize pillar parts of gates and there is a gate for which the virtual lines A were not able to be set in the process of step S106, for example, the virtual line setter 124A may set the virtual lines B from the beginning without setting the virtual lines A and set the virtual lines C on the basis of the virtual lines B. More specifically, the virtual lines C are set such that they are separated from the virtual lines B by a predetermined width or more and do not intersect other virtual lines. Accordingly, virtual lines can also be set for a gate whose pillar parts were not able to be recognized.

According to the above-described process, virtual lines are set for available gates and each virtual line is set to be separated from a neighboring virtual line set to associate with a neighboring gate by a predetermined width. Meanwhile, virtual lines may also be set for a closed gate.

Figure 7:
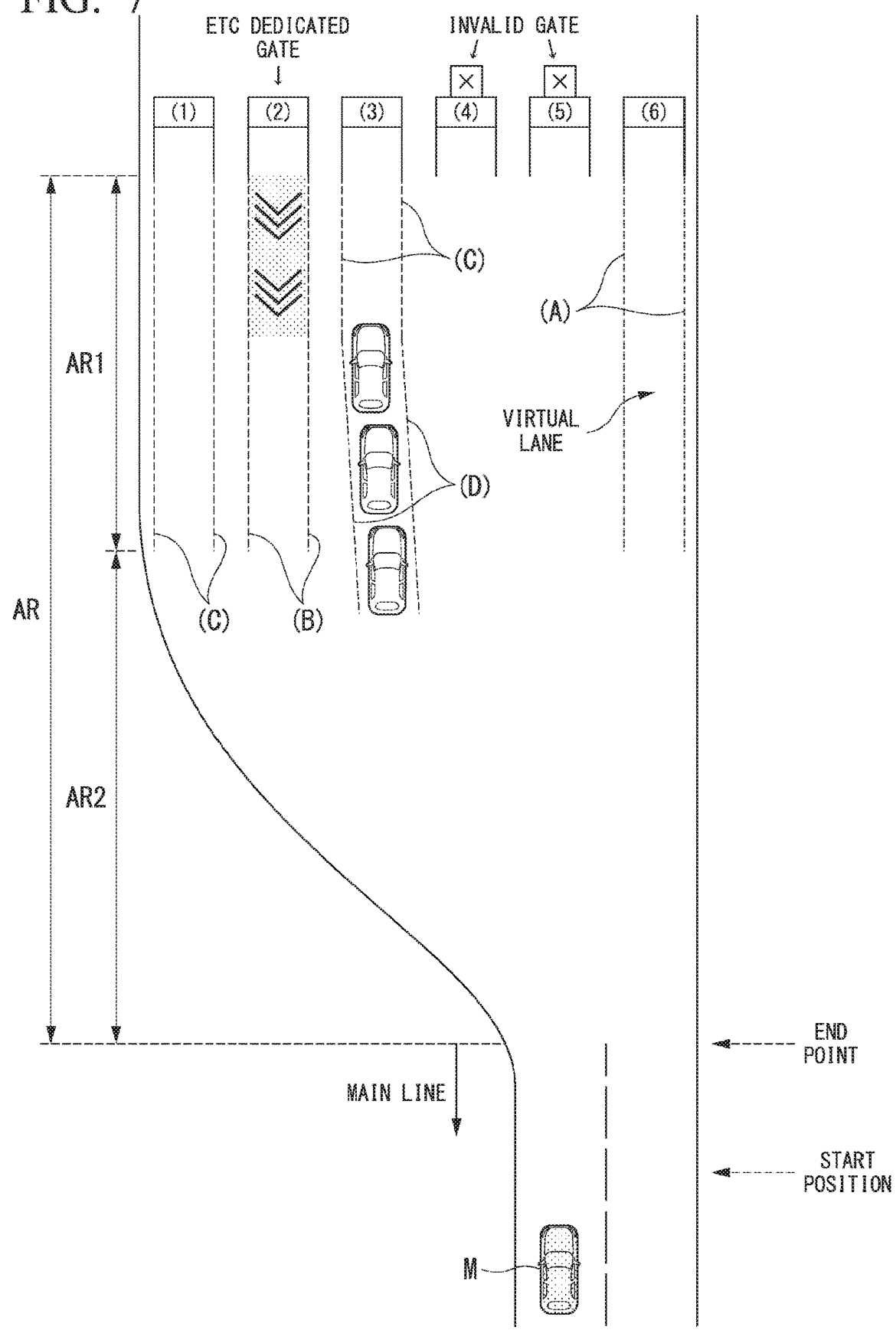
FIG. 7 is a diagram showing an example of a state in which virtual lines D are set.

Further, the virtual line setter 124A sets virtual lines D on the basis of the sides of vehicles which form a vehicle queue and replaces virtual lines set for a gate for which the vehicle queue is formed with the virtual lines D (step S112). FIG. 7 is a diagram showing an example of a state in which the virtual lines D are set. For example, when a vehicle queue is present for the gate 3, the virtual line setter 124A replaces virtual lines C of an area in which the vehicle queue is present with the virtual lines D. Then, the virtual line setter 124A connects the virtual lines D and virtual lines C set in an area in which a vehicle queue is not present to set a virtual lane. Meanwhile, although there may be a case in which the virtual lines D intersect other virtual lines according to an arrangement of a vehicle queue, in this case, the virtual lines D take priority and the virtual line setter 124A separates other virtual lines from the virtual lines D by a predetermined width or more and resets the virtual lines such that the virtual lines do not intersect each other. In addition, the virtual lines D may be set to extend to the vehicle at the end of the vehicle queue instead of being set toward the front side of the gate in a predetermined length or set in the gate front area AR1. When virtual lines are set in this manner, virtual lines are set in front of a gate and a virtual lane formed by the virtual lines is set.

Next, the gate selector 124B selects a gate through which the host vehicle M will pass (step S114). Then, the gate passing controller 124C controls the host vehicle M such that the host vehicle M passes through the gate selected in step S114 on the basis of the virtual lines set through the virtual line setting process (step S116). The gate selector 124B derives times required for the host vehicle M to be able to pass through respective gates from the current position on the basis of information about the gates. The gate selector 124B selects a gate estimated to be a gate through which the host vehicle M can pass within the shortest time among the derived times as a candidate gate. For example, when a vehicle queue is not formed for any gate, a gate present at a position a shortest distance from the position of the host vehicle M is selected as a candidate gate. In addition, when vehicle queues have been formed for gates, for example, a gate having a shortest vehicle queue length or a gate having a vehicle queue in which vehicles travel at a highest speed is selected as a candidate gate. The gate selector 124B selects the candidate gate as a gate through which the host vehicle M will pass when the gate selector 124B determines that passing through the candidate gate is optimal on the basis of a time in which the host vehicle M can pass through each gate, the position of the host vehicle M, the positions of neighboring vehicles and behaviors of the neighboring vehicles in addition to stability and efficiency. On the other hand, when the gate selector 124B determines that passing through the candidate gate is not optimal and passing through another gate is optimal in view of stability and efficiency, the gate selector 124B selects the gate determined to be optimal as a candidate gate through which the host vehicle M will pass.

Further, the gate selector 124B may set only ETC dedicated gates as candidate gates through which the host vehicle M will pass or set ETC dedicated gates, general gates and ETC/general gates as candidate gates when the ETC onboard device 40 is available. The gate selector 124B may set general gates and ETC/general gates as candidate gates when the ETC onboard device 40 is not available.

The gate passing controller 124C controls the host vehicle M such that the host vehicle M passes through the gate selected by the gate selector 124B. For example, when the host vehicle M travels in the virtual line-free area AR2, the gate passing controller 124C may control the host vehicle M such that the host vehicle M enters a virtual lane set to associate with the gate selected by the gate selector 124B or control the host vehicle M such that the host vehicle M follows the back of a vehicle present in a virtual lane set to associate with the gate selected by the gate selector 124B.

Next, the gate passing controller 124C determines whether the host vehicle M has passed through the gate selected by the gate selector 124B (step S118). When the host vehicle M has passed through the gate, the procedure of this flowchart ends. When the host vehicle M has not passed through the gate, the procedure returns to step S102. Accordingly, the procedure of this flowchart ends.

Meanwhile, the above-described processing order is an example and the processing order may be appropriately changed. For example, the virtual line setter 124A may set virtual lines in such a manner that the virtual lines are set on the basis of road markings and then extend from pillar parts of a gate to the front side. In addition, the virtual line setter 124A may set virtual lines on the basis of sides of vehicles that form a vehicle queue and then set virtual lines on the basis of road markings and pillar parts of a gate, and connect the virtual lines set on the basis of the sides of the vehicles and the virtual lines set on the basis of the road markings and pillar parts of gates to set virtual lines for a predetermined gate, for example. Further, the virtual line setter 124A may set virtual lines by performing one or a plurality of processes among the processes of steps S106 to S112. For example, the virtual line setter 124A may set virtual lines by extending the virtual lines from pillar parts of a gate or set virtual lines on the basis of pillar parts of a gate and road markings when vehicles are not present in the gate front area AR1. In addition, when vehicle queues are formed for all gates, the virtual line setter 124A may set virtual lines on the basis of the sides of vehicles that form the vehicle queues. Further, the gate selector 124B may select a gate and the virtual line setter 124A may set virtual lines only for the gate selected by the gate selector 124B, for example.

Moreover, although the virtual line-free area AR2 is provided in the above-described process, instead of this, virtual lines may also be set in the virtual line-free area AR2. In this case, virtual lines may be set such that virtual lines set in the gate front area AR1 extend to the virtual line-free area AR2, for example.

In addition, the virtual line setter 124A may set virtual lines on the basis of a behavior of another vehicle traveling in the lane marking-free area AR. For example, the virtual line setter 124A may set virtual lines on the basis of a moving trajectory of another vehicle traveling in the virtual line-free area AR2 in front of and within a predetermined distance from the host vehicle M. When the other vehicle that is a target has entered the gate 2 from a main line, virtual lines are set on the basis of a moving trajectory of the target vehicle which has traveled to enter the gate 2 in the virtual line-free area AR2. Accordingly, virtual lines are set and a virtual lane is formed also in the virtual line-free area AR2. As a result, the gate passing controller 124C can easily control the host vehicle M such that the host vehicle M passes through a gate by controlling the host vehicle M such that the host vehicle M travels in the formed virtual lane.

In addition, the virtual line setter 124A may correct virtual lines on the basis of a behavior of another vehicle traveling in the land marking-free area AR. In this case, the virtual line setter 124A corrects virtual lines on the basis of a moving trajectory of another vehicle traveling in the lane marking-free area AR in front and a predetermined distance ahead of the host vehicle M. For example, when another vehicle is traveling while actually deviating or protruding from a virtual lane formed by set virtual lines, the virtual line setter 124A may correct the virtual lines on the basis of the actual behavior of the other vehicle. Accordingly, the virtual lines become more suitable for the actual situation.

According to the above-described first embodiment, the automated driving controller 100 can control a vehicle more smoothly by controlling the vehicle on the basis of a virtual lane set by the virtual line setter 124A.

Second Embodiment

Hereinafter, a second embodiment will be described. Virtual lines are not set in the virtual line-free area AR2 in the first embodiment. On the contrary, virtual lines are also set in the virtual line-free area AR2 in the second embodiment. Hereafter, description will be made focusing on a difference from the first embodiment.

The virtual line setter 124A sets virtual lines which associate with all gates and extend to the side of the lane marking-free area AR.

Figure 8:
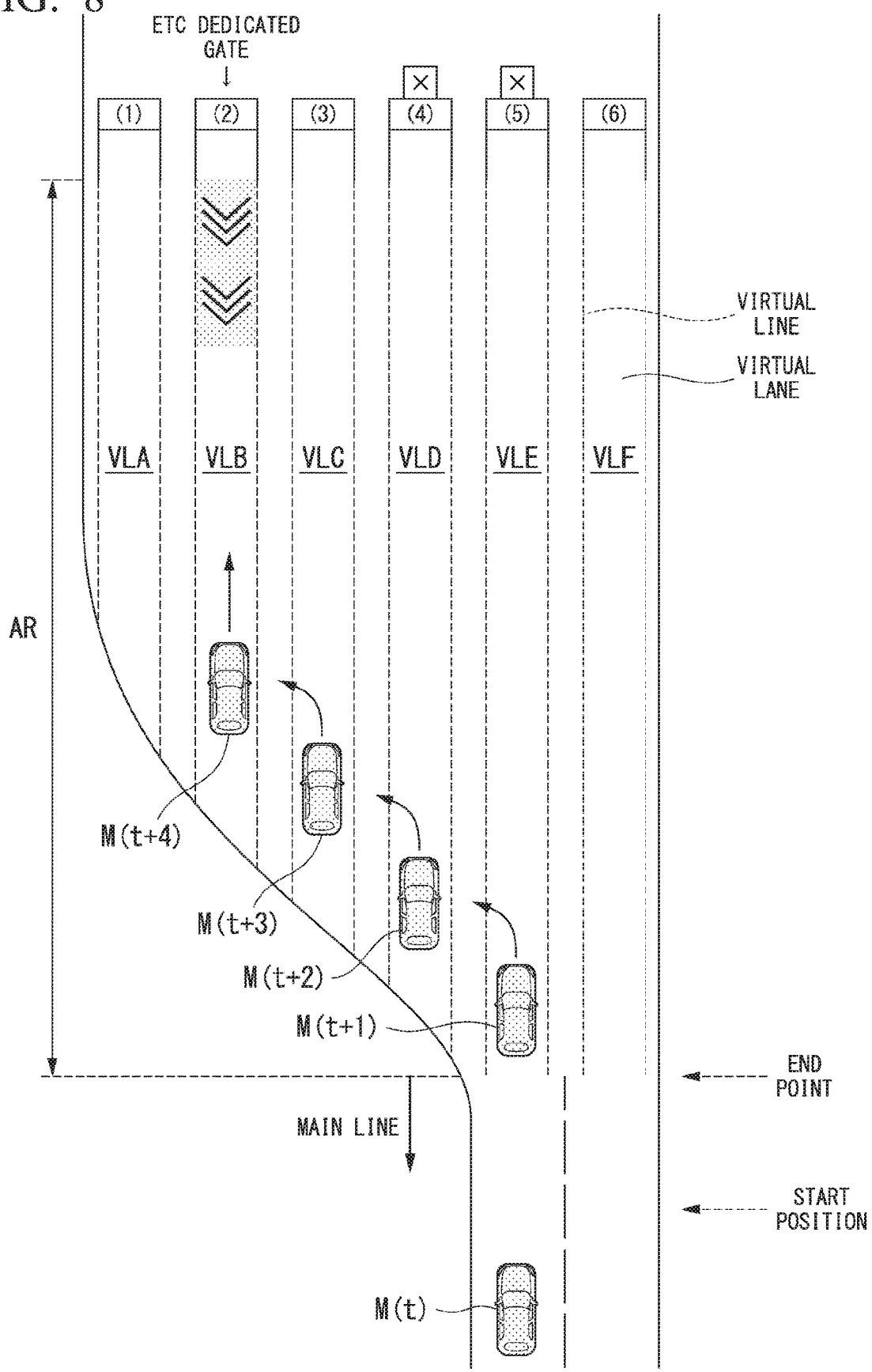
FIG. 8 is a diagram showing another example of a state in the vicinity of gates.

FIG. 8 is a diagram showing another example of a state in vicinity of gates. As shown, the virtual line setter 124A sets virtual lines extending from both ends of pillar parts of each of gates 1 to 6 to the front side. These virtual lines may be set in the lane marking-free area AR, for example.

There is a case in which a plurality of virtual lanes formed by virtual lines are connected to a lane of a main line at the end points of set virtual lines and the end point of the main line. In this case, the gate passing controller 124C may control the host vehicle M on the assumption that the main line branches to the plurality of virtual lanes formed by the virtual lines, for example. Further, when a plurality of virtual lanes are connected to the main line, the gate passing controller 124C may control the host vehicle M by regarding a virtual lane having a highest degree of overlapping with the main line as a preference lane and regarding other virtual lanes as branch lanes. Hereinafter, lanes formed by virtual lines set for the gates 1 to 6 are referred to as virtual lanes VLA to VLF.

More specifically, when the gate selector 124B selects the gate 2 as a candidate gate through which the host vehicle M will pass, the gate passing controller 124C causes the host vehicle M to enter the virtual lane VLE which is a preference lane from the main line (M(t+1) in the figure) and causes the host vehicle M to change lanes in the order of the virtual lane VLD (M(t+2) in the figure), the virtual lane VLC (M(t+3) in the figure) and the virtual lane VLB (M(t+4) in the figure) from the virtual lane VLE. Then, the gate passing controller 124C causes the host vehicle M to travel along the virtual lane VLB to pass through the gate 2.

Further, there is a case in which virtual lines are connected to a region near the center of the main line at the end points of set virtual lines and the end point of the main line. In this case, the gate passing controller 124C causes the host vehicle M to change lanes to a virtual lane set to associate with a gate selected by the gate selector 124B from a state in which the host vehicle M travels across the virtual lines.

In this manner, the virtual line setter 124A sets virtual lines to the end point of the main line. As a result, the gate passing controller 124C can control the behavior of the host vehicle M on the basis of a virtual lane generated by set virtual lines and thus can easily control the host vehicle M.

Meanwhile, in addition to the method of setting virtual lines such that the virtual lines associate with all gates and extend to the side of the lane marking-free area AR, the method of setting virtual lines described in the first embodiment may be employed. For example, virtual lines may be set on the basis of the sides of vehicles in a vehicle queue when the vehicle queue has been formed for a gate, and the method of setting virtual lines of the second embodiment may be used for a gate for which a vehicle queue is not present.

According to the above-described second embodiment, since the virtual line setter 124A sets virtual lines to the end of the main line, the gate passing controller 124C can easily control the host vehicle M by causing the host vehicle M to travel in a virtual lane connected to the main line while changing or maintaining lanes.

Third Embodiment

Hereinafter, a third embodiment will be described. In the third embodiment, the virtual line setter 124A sets virtual lines in the lane marking-free area AR further on the basis of trajectories along which other vehicles traveled in the lane marking-free area AR in the past. Hereinafter, a description will be made focusing on a difference from the first embodiment.

Figure 9:
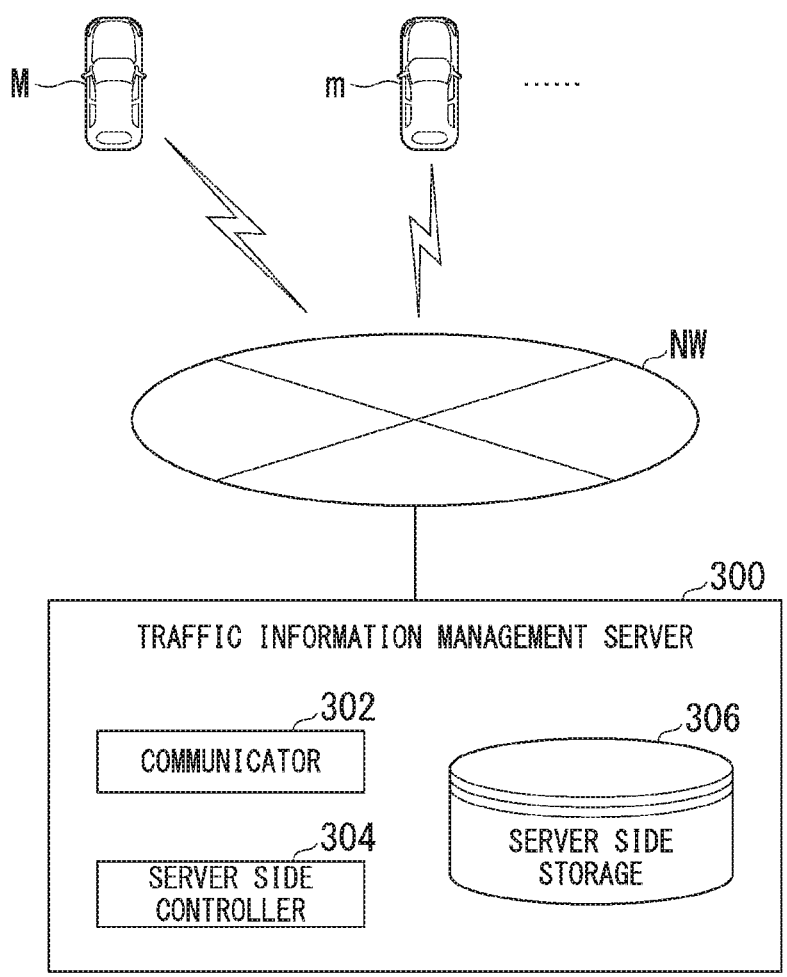
FIG. 9 is a diagram showing an example of a traffic information providing system including the host vehicle M equipped with the vehicle system 1.

FIG. 9 is a diagram showing an example of a traffic information providing system including the host vehicle M in which the vehicle system 1 is mounted. The traffic information providing system includes the host vehicle M, at least one other vehicle m, and a traffic information management server 300. For example, the other vehicle m is equipped with at least a communication device communicating with the traffic information management server 300 and a device having a function of identifying a location thereof. The other vehicle m equipped with these devices transmits positional information thereof to the traffic information management server 300.

Communication using, for example, a network MW is performed between one or both of the host vehicle M and the other vehicle m and the traffic information management server 300. For example, the network NW may include a cellular network, a Wi-Fi network, a wide area network (WAN), a local area network (LAN), the Internet, a dedicated line, a wireless base station, a provider, and so on.

The traffic information management server 300 manages traffic information based on information transmitted from vehicles, detection results of vehicle detection sensors (e.g., cameras) installed on roads, and the like. In addition, the traffic information management server 300 delivers managed traffic information to vehicles or transmits traffic information to a request source in response to a request from a vehicle in a predetermined period using the aforementioned network NW.

The traffic information management server 300 may include a communicator 302, a server side controller 304, and a server side storage 306, for example. The server side controller 304 is implemented by a processor executing a program. In addition, the server side controller 304 may be implemented by hardware such as an LSI circuit or an ASIC or implemented by a combination of software and hardware. The server side storage 306 is realized by a ROM, a RAM, an HDD, a flash memory, or the like.

The communicator 302 communicates with vehicles to acquire information. The communicator 302 acquires vehicle IDs of the vehicles (vehicle identification information) and positional information indicating the positions of the vehicles along with transmission times at which the information is transmitted. Hereinafter, this information is referred to as "vehicle information."

The server side controller 304 transmits information about the vehicle information to the host vehicle M at the request of the host vehicle M. In this case, the server side controller 304 derives positional information of other vehicles in a link designated according to a request by referring to the vehicle information using the designated link as a search key and provides the derived positional information to the host vehicle M.

The virtual line setter 124A sets virtual lines in the lane marking-free area AR on the basis of the positional information of the other vehicles transmitted by the traffic information management server 300. Further, virtual lines may be set only within a predetermined region of the lane marking-free area AR.

Figure 10:
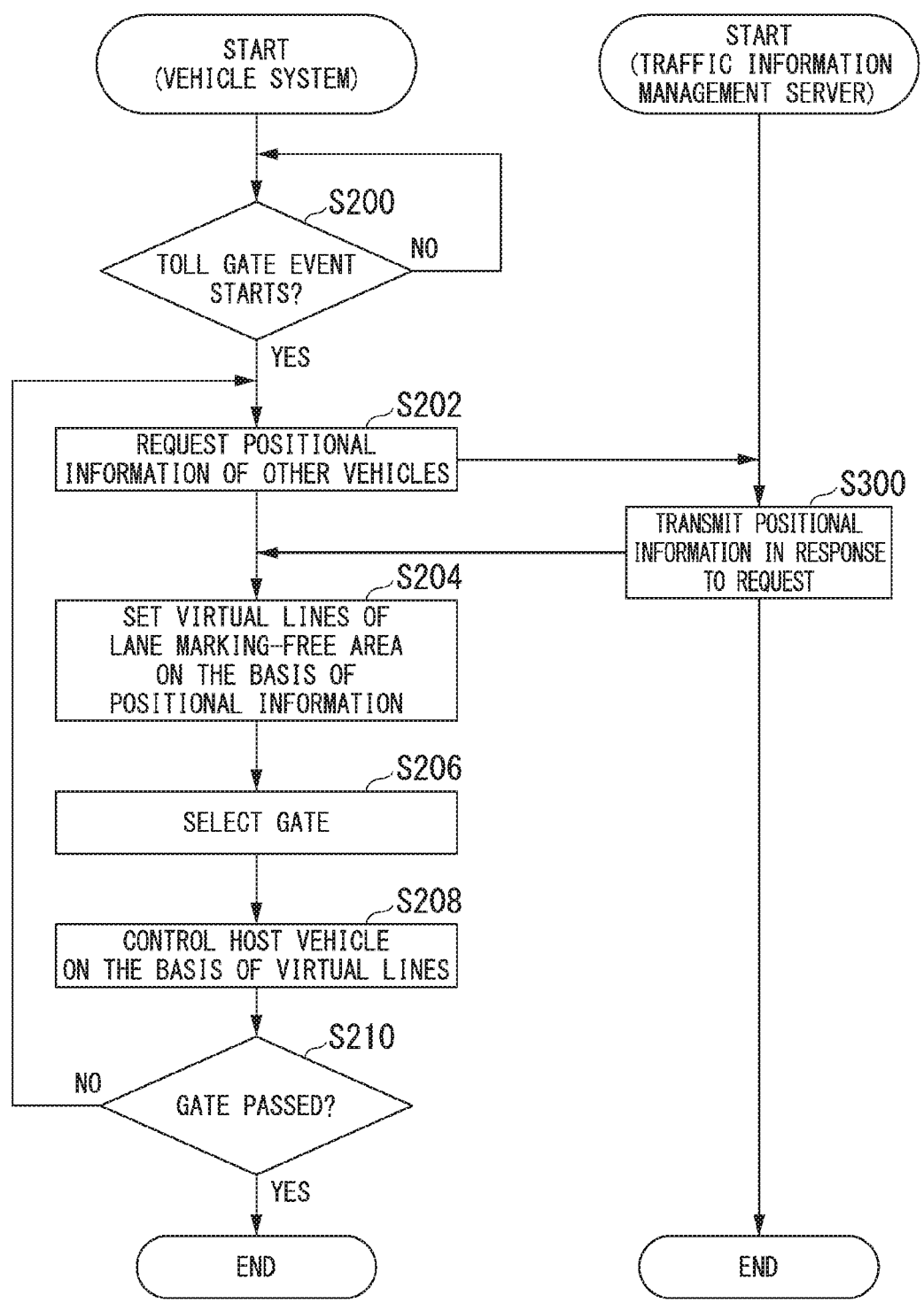
FIG. 10 is a flowchart showing a flow of a procedure performed by the vehicle system 1 and a traffic information management server 300.

FIG. 10 is a flowchart showing a flow of a procedure performed by the vehicle system 1 and the traffic information management server 300. First, the vehicle system 1 waits until the action plan generator 123 of the vehicle system 1 starts a toll gate event (step S200). When the toll gate event is started, the virtual line setter 124A requests transmission of positional information of other vehicles m from the traffic information management server 300 (step S202). Here, the positional information of the other vehicles m requested by the virtual line setter 124A is positional information of other vehicles m which have passed through a gate of a toll gate through which the host vehicle M will pass during a time between the current time and a predetermined time ahead.

Next, the server side controller 304 of the traffic information management server 300 transmits positional information of other vehicles stored in the server side storage 306 to the vehicle system 1 in response to the request transmitted by the virtual line setter 124A (step S300). Then, the virtual line setter 124A sets virtual lines in the lane marking-free area AR on the basis of the positional information transmitted from the traffic information management server 300 (step S204). Next, the gate selector 124B selects a gate through which the host vehicle M will pass (step S206). Thereafter, the gate passing controller 124C controls the host vehicle M such that the host vehicle M passes through the gate selected in step S206 on the basis of the virtual lines set in step S204 (step S208). Next, the gate passing controller 124C determines whether the host vehicle M has passed through the gate selected by the gate selector 124B (step S210). When the host vehicle M has passed through the gate, the procedure of this flowchart ends. When the host vehicle M has not passed through the gate, the procedure returns to the process of step S202. Accordingly, the procedure of this flowchart ends.

Meanwhile, although the traffic information management server 300 transmits positional information of other vehicles m to the vehicle system 1 in the above-described example, instead of this, the server side controller 304 of the traffic information management server 300 may generate virtual lines and transmit information about the generated virtual lines (e.g., positional information of the virtual lines) to the vehicle system 1. In this case, the virtual line setter 124A acquires the information about the virtual lines from the traffic information management server 300 and set virtual lines on the basis of the acquired information.

Figure 11:
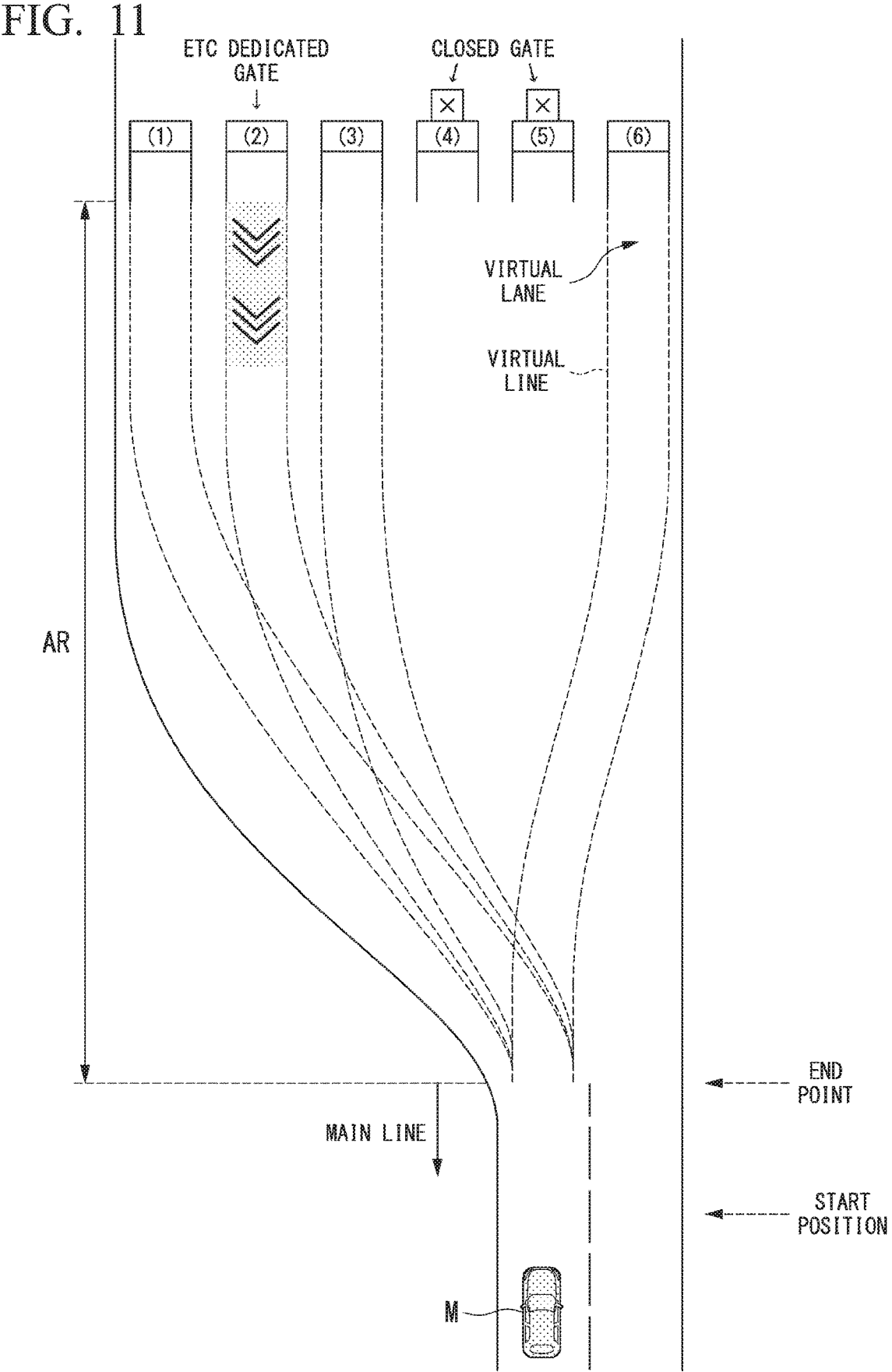
FIG. 11 is a diagram showing a state in which virtual lines are set in a virtual line-free area AR2.

FIG. 11 is a diagram showing a state in which virtual lines are set in the lane marking-free area AR. Redundant description with respect to FIG. 5 is omitted. The virtual line setter 124A sets virtual lines in the lane marking-free area AR on the basis of moving trajectories of other vehicles m acquired from the traffic information management server 300. These virtual lines are lines connecting reference positions set on the basis of moving trajectories of other vehicles m derived by the virtual line setter 124A. These reference positions are positions based on averages, medians and the like of derived moving trajectories on the basis of moving trajectories (coordinates on the plane) of a plurality of other vehicles m for each predetermined interval on the basis of the end point of the main line in the lane marking-free area AR.

In addition, the gate passing controller 124C causes the host vehicle M to travel in a virtual lane formed by virtual lines in the lane marking-free area AR to pass through a predetermined gate. For example, virtual lines set in vicinity of the main line overlap and virtual lines branch to respective gates with decreasing distance to the gates in the lane marking-free area AR. Here, when the host vehicle M travels from a section in which virtual lines overlap to a section in which virtual lines branch, the gate passing controller 124C controls the host vehicle M as in a case in which a road branches.

Furthermore, although virtual lines are set in the lane marking-free area AR in the above description, virtual lines may be set only in the virtual line-free area AR2 on the basis of trajectories along which other vehicles m traveled in the virtual line-free area AR2 in the past.

Figure 12:
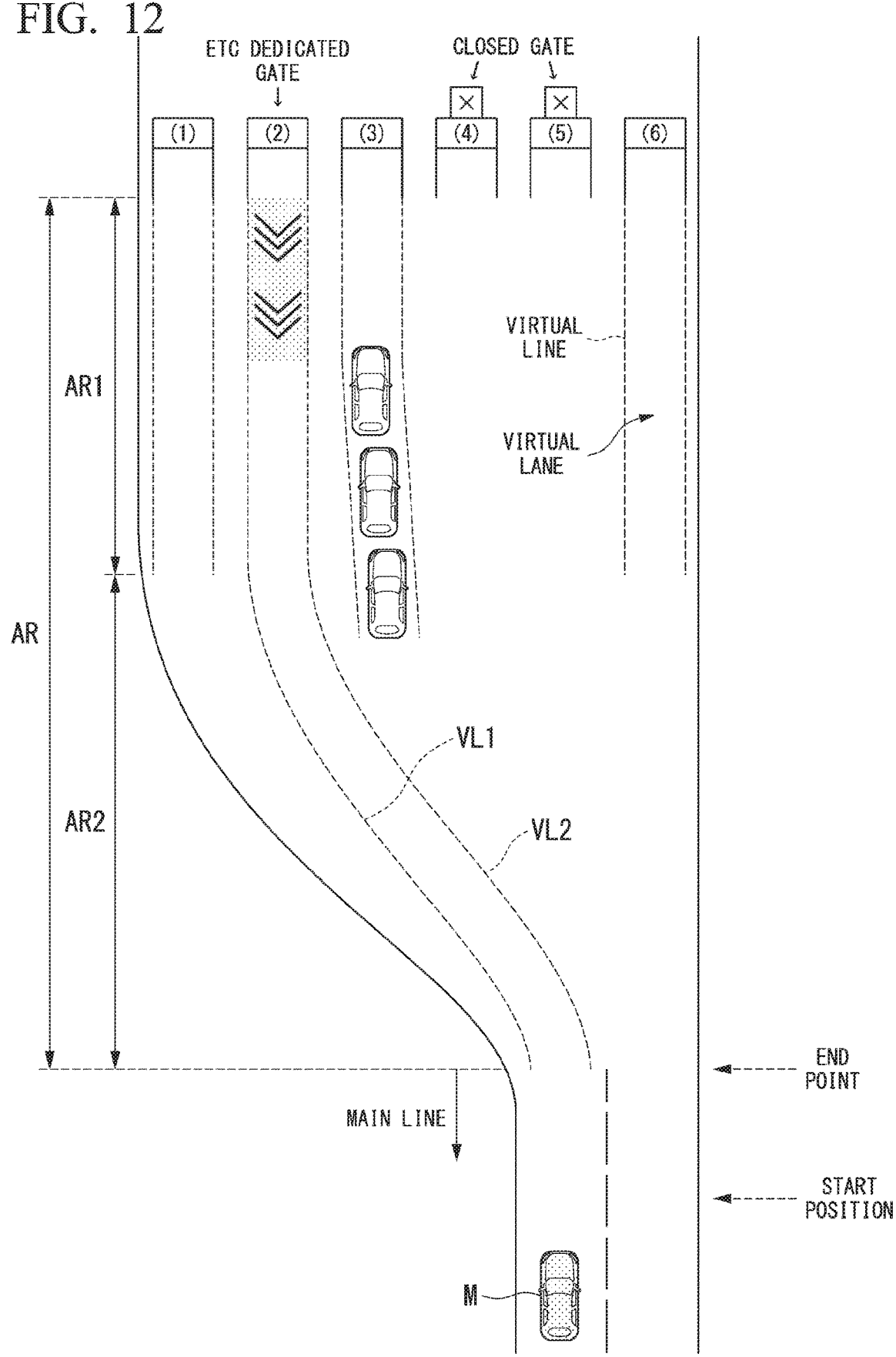
FIG. 12 is a diagram showing a state in which virtual lines are set in the virtual line-free area AR2.

FIG. 12 is a diagram showing a state in which virtual lines are set in the virtual line-free area AR2. For example, the virtual line setter 124A may set virtual lines associated with a candidate gate. The virtual line setter 124A sets virtual lines VL1 and VL2 in the virtual line-free area AR2 on the basis of moving trajectories when other vehicles m have entered the candidate gate (e.g., the gate 2) from a main line, which are acquired from the traffic information management server 300. In addition, the virtual line setter 124A sets virtual lines such that the virtual lines set in the virtual line-free area AR2 are connected to the end points of the virtual lines set through the virtual line setting process of the flowchart of FIG. 4 using the end point of the main line as a start time. Accordingly, the virtual lines VL1 and VL2 are set in the virtual line-free area AR2 as shown.

Meanwhile, although the virtual lines VL1 and VL2 connected to the gate 2 which is a candidate gate are set in the example of FIG. 12, virtual lines may also be set for other gates.

According to the above-described third embodiment, the virtual line setter 124A can set more appropriate virtual lanes by setting virtual lines on the basis of past positional information of other vehicles m. As a result, it is possible to realize smoother vehicle control.

While forms for embodying the present invention have been described using embodiments, the present invention is not limited to these embodiments and various modifications and substitutions can be made without departing from the spirit or scope of the present invention.

What is claimed is:

1. A vehicle control system located in an own-vehicle, comprising:
    a processor configured to:
    virtually project virtual lines in front of each of a plurality of gates based on each position of the plurality of gates, and side portions of other vehicles, the other vehicles forming a vehicle queue and being planned to pass a gate included in the plurality of gates, each of the virtual lines being connected with a gate corresponding to the each of the virtual lines;
    select a selected gate through which the own-vehicle will pass from among the plurality of gates based on each position of the other vehicles that are present in front of each of the plurality of gates or each estimated time in which the own-vehicle will pass through each of the plurality of gates, and
control the own-vehicle so that the own-vehicle travels along the virtual lines that are connected with the selected gate and passes through the selected gate.

2. The vehicle control system according to claim 1, wherein the processor is configured to virtually project the virtual lines such that the virtual lines extend from pillar parts of the gate to a front side of the gate.

3. The vehicle control system according to claim 2, wherein the processor is configured to virtually project the virtual lines based on road signs in front of the gate.

4. The vehicle control system according to claim 3, wherein the processor is configured to virtually project the second virtual lines associated with a second gate neighboring a first gate based on first virtual lines associated with the first gate and virtually projected based on the road signs, the second virtual lines being separated from the first virtual lines by a predetermined width.

5. The vehicle control system according to claim 4,
wherein the first virtual lines are connected with the first gate and are not connected with the second gate, and
the second virtual lines are connected with the second gate and are not connected with the first gate.

6. The vehicle control system according to claim 1, wherein the processor is configured to virtually project the virtual lines based on road signs in front of the gate.

7. The vehicle control system according to claim 6, wherein the processor is configured to virtually project second virtual lines associated with a second gate neighboring a first gate based on first virtual lines associated with the first gate and virtually projected based on the road signs, the second virtual lines being separated from the first virtual lines by a predetermined width.

8. The vehicle control system according to claim 7,
wherein the first virtual lines are connected with the first gate and are not connected with the second gate, and
the second virtual lines are connected with the second gate and are not connected with the first gate.

9. The vehicle control system according to claim 1, wherein the processor is further configured to:
acquire information representing operating states of gates, and
virtually project virtual lines associated with a gate which is not closed and recognized based on the operating states of gates.

10. The vehicle control system according to claim 1, wherein the processor is configured to virtually project the virtual lines based on behaviors of vehicles present around the own-vehicle.

11. The vehicle control system according to claim 1, wherein the processor is configured to acquire positional information of vehicles which have traveled in front of the gates and virtually project the virtual lines based on the positional information.

12. The vehicle control system according to claim 1,
wherein the virtual lines comprise first virtual lines, second virtual lines, third virtual lines, and fourth virtual lines,
the plurality of gates comprise a first gate, a second gate, a third gate, and a fourth gate,
the third virtual lines are connected with the third gate and are not connected with the fourth gate, and the fourth virtual lines are connected with the fourth gate and is not connected with the third gate.

13. The vehicle control system according to claim 12,
wherein the processor is configured to virtually project fifth virtual lines in front of each of the plurality of gates based on a position of each the plurality of gates, virtually project sixth virtual lines based on side portions of the other vehicles which form the vehicle queue, and replace seventh virtual lines associated with an area in which the vehicle queue is present with the sixth virtual lines, the seventh virtual lines are included in the fifth virtual lines in front of each of the plurality of gates.

14. A vehicle control method using a vehicle control device located in an own-vehicle, the vehicle control method comprising:
virtually projecting virtual lines in front of each of a plurality of gates based on each position of the plurality of gates and side portions of other vehicles, the other vehicles forming a vehicle queue and being planned to pass a gate included in the plurality of gates, each of the virtual lines being connected with a gate corresponding to the each of the virtual lines;
selecting a selected gate through which the own-vehicle will pass from among the plurality of gates based on each position of vehicles that are present in front of each of the plurality of gates or each estimated time in which the own-vehicle will pass through each of the plurality of gates, and
controlling the own-vehicle so that the own-vehicle travels along the virtual lines that is connected with the selected gate and passes through the selected gate.

15. A non-transitory computer-readable storage medium that stores a computer program to be executed by a computer located in an own-vehicle to perform at least:
virtually project virtual lines in front of each of up to the reality of gates based on each position of the plurality of gates and side portions of other vehicles, the other vehicles forming a vehicle queue and being planned to pass a gate included in the plurality of gates, each of the virtual lines being connected with a gate corresponding to each of the virtual lines;
select a selected gate through which the own-vehicle will pass from among the plurality of gates based on each position of vehicles that are present in front of each of the plurality of gates or each estimated time in which the own-vehicle will pass through each of the plurality of gates, and
control the own-vehicle so that the own-vehicle travels along the virtual lines that is connected with the selected gate and passes through the selected gate.

* * * * *